(12) United States Patent
Masquelier et al.

(10) Patent No.: US 6,835,500 B2
(45) Date of Patent: Dec. 28, 2004

(54) HYDRATED IRON PHOSPHATE ELECTRODE MATERIALS FOR RECHARGEABLE LITHIUM BATTERY CELL SYSTEMS

(75) Inventors: Christian Masquelier, Amiens (FR); Mathieu Morcrette, Amiens (FR); Priscilla Reale, Latina (IT); Calin Wurm, Amiens (FR)

(73) Assignee: Rutgers University, New Brunswick, NJ (US)

( * ) Notice: Subject to any disclaimer, the term of this patent is extended or adjusted under 35 U.S.C. 154(b) by 275 days.

(21) Appl. No.: 09/969,175

(22) Filed: Oct. 2, 2001

(65) Prior Publication Data

US 2003/0064287 A1 Apr. 3, 2003

(51) Int. Cl.$^7$ ................................. H01M 4/58

(52) U.S. Cl. .............................. 429/231.95; 429/218.1; 423/632

(58) Field of Search ................................. 429/137, 232, 429/218.1, 221, 231.8, 231.1, 224, 231.95, 231.2; 423/632

(56) References Cited

U.S. PATENT DOCUMENTS

| | | | |
|---|---|---|---|
| 6,514,640 B1 | * | 2/2003 | Armand et al. ........... 429/231.1 |
| 2001/0023089 A1 | * | 9/2001 | Yamazaki et al. .......... 438/142 |
| 2002/0114754 A1 | * | 8/2002 | Hosoya et al. ............. 423/306 |

* cited by examiner

*Primary Examiner*—Frankie L. Stinson
*Assistant Examiner*—Monique Wills (57) ABSTRACT

The electrochemical performance of rechargeable lithium battery cells comprising crystalline or amorphous $Fe^{III}$ iron phosphate active positive electrode compounds is improved by compound hydration and intimate ball-milled incorporation of electrically conductive carbon.

19 Claims, 6 Drawing Sheets

HYDRATED IRON PHOSPHATE ELECTRODE MATERIALS FOR RECHARGEABLE LITHIUM BATTERY CELL SYSTEMS

BACKGROUND OF THE INVENTION

The present invention relates to rechargeable electrochemical energy storage systems, particularly such systems including electrochemical cells comprising complementary electrodes capable of reversibly intercalating, alloying, or otherwise alternately combining with and releasing lithium ions in electrical energy charge and discharge operations. The invention comprises, in its preferred embodiments, high capacity lithium battery cells comprising hydrated iron phosphate electrodes which provide stable discharge capacity in such cells.

Carbonaceous electrode materials, such as petroleum coke, hard carbon, and graphite, have been widely investigated and are regularly employed as active electrode materials in lithium and lithium-ion cells, but these materials are limited in volumetric capacity and present other difficulties, such as their contributing to the instability and degradation of electrolyte compositions.

More recently, three-dimensionally structured compounds comprising polyanions, e.g., $(SO_4)^{n-}$, $(PO_4)^{n-}$, $(AsO_4)^{n-}$, and the like, have been proposed to replace the simple oxides as viable alternatives to $LiM_xO_y$ electrode materials. For example, the electrochemical functionality of such potential electrode materials as ordered crystalline olivine-form $LiMPO_4$ compounds comprising transition metal cations, such as Mn, Fe, Co or the like, has been discussed at length by Goodenough et al. in U.S. Pat. No. 5,910,382. Similar functionality of other lithiated complex transition metal $(PO_4)^{n-}$ compounds has been discussed by Barker et al. in U.S. Pat. No. 5,871,866. Although these classes of crystalline lithiated phosphate compounds have exhibited some promise as electrode components, they possess significant drawbacks, such as an electrically insulating nature typified in the prevalent preferred materials, e.g., $LiFePO_4$, and the fact that retaining the $Fe^{II}$ state in such preferred compounds necessitates difficult and expensive syntheses in order to prevent the formation of stable compounds, such as crystalline $Fe^{III}$ phosphates, e.g., $LiFeP_2O_7$, or lithiated amorphous $Fe^{III}$ phosphate compounds, from which efficient delithiation is not significantly attainable.

In order to address these shortcomings of previously employed crystalline lithiated iron phosphates, e.g., olivine $LiFePO_4$ and Nasicon compositions, the present invention entails the use of more widely available, stable non-lithiated $Fe^{III}$ compounds of not only crystalline conformation, but also of amorphous character, as primary active electrode components in the fabrication of lithium-ion electrochemical battery cells. A further departure from the previous art resides in the additional use, with significant improvement in economy as well as operational results, of the more readily occurring and economical hydrated forms of these stable iron phosphate compounds.

SUMMARY OF THE INVENTION

Figure 1:
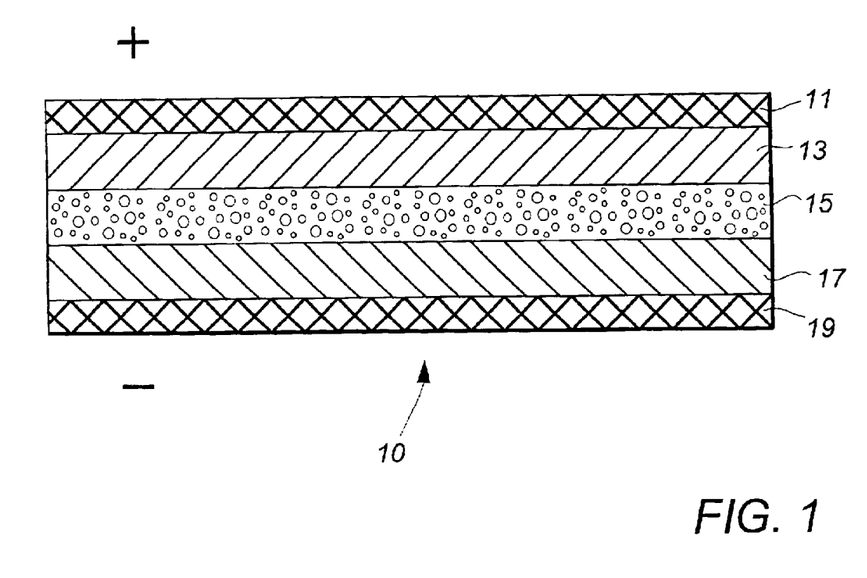
FIG. 1 depicts schematically in cross-section elevation a typical rechargeable electrochemical lithium battery cell embodying the present invention.

The electrode materials of the present invention may be employed in any of the rechargeable electrochemical battery cell fabrication styles commonly in use throughout the industry. For example, these iron phosphate compounds may be incorporated as active electrode component in the rigid metal casing compression style typified by the well-known "button" battery, as well as in the semi-rigid or flexible film-encased laminated component polymer layer style of more recent development, such as is generally represented in FIG. 1 and more specifically described in U.S. Pat. No. 5,840,087. Complementary electrode materials, including lithium compounds and alloys which provide a source of mobile lithium ions during cell operation, may be selected from any such as are presently in use in current battery cell fabrication, as may separator and electrolyte components and compositions which have been widely described.

The active electrode materials of the invention typically comprise the positive electrode of a cell combination which reversibly incorporates lithium ions during electrical cell discharge, generally by ion insertion or intercalation into the iron phosphate structure. The useful iron phosphate compounds comprise substantially stable $Fe^{III}$ materials, including both crystalline and amorphous forms, as well as hydrates of these compounds. The preferred economical amorphous compounds may be readily obtained in hydrated form from commercial sources, e.g., Aldrich Chemical Company, Inc., Milwaukee, Wis., USA. Such pristine (as purchased) commercial compounds as $FePO_4 \cdot nH_2O$ and $Fe_4(P_2O_7)_3 \cdot nH_2O$, nominally comprising $1 \leq n \leq 4$, may be advantageously obtained as 100 nm particle materials which exhibit little agglomeration, the former having specific surface of about 18 to 30 $m^2/g$.

Performance comparison of cells comprising analogous morphology variants of preferred active materials, e.g., pristine amorphous $FePO_4 \cdot nH_2O$, anhydrous $FePO_4$ obtained from heating that material to about 400° C., and crystalline $FePO_4$ obtained from further heating and sintering above about 800° C., reveals a graduated decrease in reversible cell capacity from the pristine form to the crystalline. The higher capacity of the hydrated material is believed to be attributable to the solvating effect of included water upon Li ion transport, while the least desirable performance of the crystalline material follows the great enlargement of particle size from the amorphous form at about 100 nm to the crystals at about 20 $\mu$m.

Further improvement in performance of these hydrated amorphous active materials is achieved by intimate mixing with battery-grade conductive carbon, such as an Acetylene Black or Super-P, preferably ball-milling for periods in excess of about 15 min up to a limit of efficiency at about 120 min. Resulting increases in cell discharge capacity to about 90% of theoretical is believed to be attributable to improved electrical conductivity provided in the material by the intimate carbon coating of the particles, since no significant change in particle size was observed. Similar treatment of crystalline active material, on the other hand, resulted in a reduction of particle size to about 500 nm, as well as in an increase of conductivity, both attributing to improvement in discharge capacity.

BRIEF DESCRIPTION OF THE DRAWING

The present invention will be described with reference to the accompanying drawing of which.

DESCRIPTION OF THE INVENTION

As shown in FIG. 1, a rechargeable battery cell in which an active electrode material of the present invention may be employed is essentially of the same structure as the lithium and Li-ion battery cells currently in common use. In this respect, such a cell 10 comprises a positive electrode member 13, a negative electrode member 17 and an interposed electrically insulative, ion-conductive separator 15 containing an electrolyte, typically in the form of a solution of a lithium salt in one or more non-aqueous solvents. Normally associated with the respective electrodes are electrically conductive current collectors 11, 19 which facilitate the application and withdrawal of cycling electrical current to and from the cell.

As earlier noted, the iron phosphate electrode materials of the invention may be used in any of the common cell fabrication styles, including the well-known "button" battery cell and the more recently preferred flexible film-encased laminated component polymer layer cell, such as is generally represented in FIG. 1. While this latter style of laminated polymer battery cell is normally employed in optimizational development, the following examples were conveniently conducted, with comparable results, in laboratory test cells of commonly used compressive Swagelok construction, such as that described in U.S. Pat. Nos. 5,110,696 and 5,196,279.

Such test cells comprised, as a laboratory expedient, a lithium metal foil disk negative electrode member 17 and an opposing positive electrode member 13 comprising a compressed powder disk of a variant active material of the present invention. The electrode members of each test were assembled, for ease of fabrication, in the Swagelok test cell with an intervening separator member 15 of borosilicate glass fiber saturated with a typical lithium-ion cell electrolyte, e.g., a 1.0 M solution of $LiPF_6$ in an equipart mixture of ethylene carbonate (EC) and dimethylcarbonate (DMC). The stainless steel compressive plunger members of the Swagelok test cell functioned as current collectors 11, 19. Each of the test cells in the following examples was cycled at the indicated rate (a transfer of 1 Li in 10 hr being designated as a C/10 rate) in a commercial automatic cycle-control and data-recording apparatus, e.g., a VMP controller (Biologic SA, Claix, France).

EXAMPLE I

At the outset, a comparison was made of the electrochemical efficacy of crystalline and amorphous nominal $FePO_4 \cdot 2H_2O$ (assayed at $1.6H_2O$) active materials. The former compound was obtained as monoclinic metastrengite crystals of about 5 μm precipitated from an aqueous solution of $Fe_2O_3$ dissolved in concentrated $H_3PO_4$, while the latter was a pristine 100 nm commercial product. The comparison was conducted with test cell positive electrodes comprising mixtures of the respective $FePO_4$ in a weight ratio of about 5:1 with Acetylene Black (AB) conductive carbon in order to provide an operative level of electrical conductivity in the electrode composition. This weight ratio was used consistently throughout the following examples. The individual compositions in this example were intimately mixed for a period of 15 min in stainless steel ball-mills having a ball charge to composition mass ratio of about 15:1 to 20:1.

Figure 2:
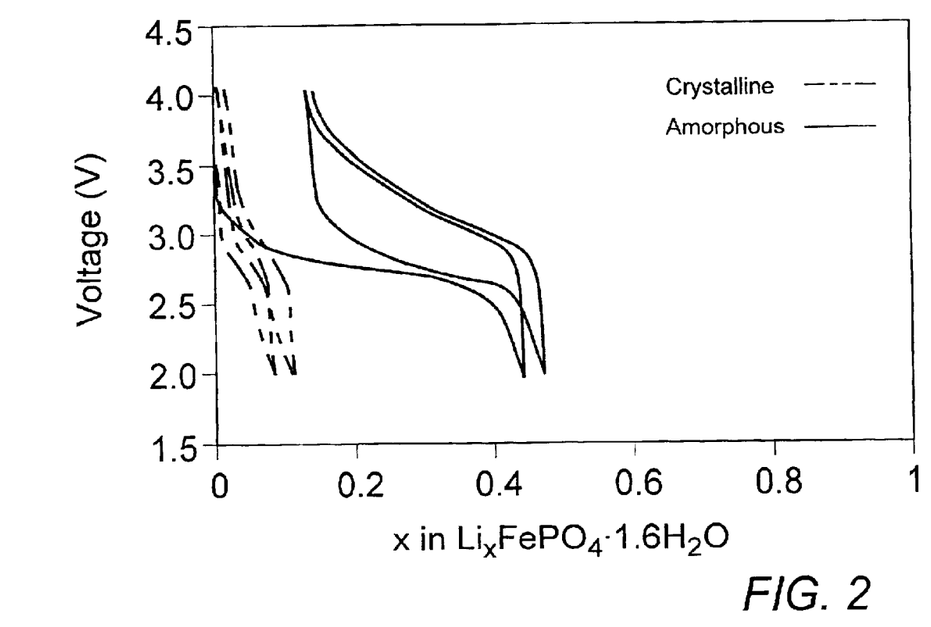
FIG. 2 depicts characteristic voltage/electrode composition profiles of cycling rechargeable battery cells comprising rudimentary crystalline and amorphous $FePO_4$ electrode compositions of the present invention.

The test cells were cycled at a constant C/10 rate and provided data for the voltage/composition profiles depicted in FIG. 2. These results show, in particular, the significant disparity in capacity of the crystalline material, likely due to the inordinately larger size of the crystal particles as well as the crystal structure itself, which would have a limiting effect on the diffusion of Li ion. Despite the rudimentary nature of these compositions which respectively provided about 10% and 38% of theoretical capacity, both of the $FePO_4 \cdot 2H_2O$ active materials showed promising reversible cycling capability with a steady discharge potential in the useful 3 V range.

EXAMPLE II

Figure 3:
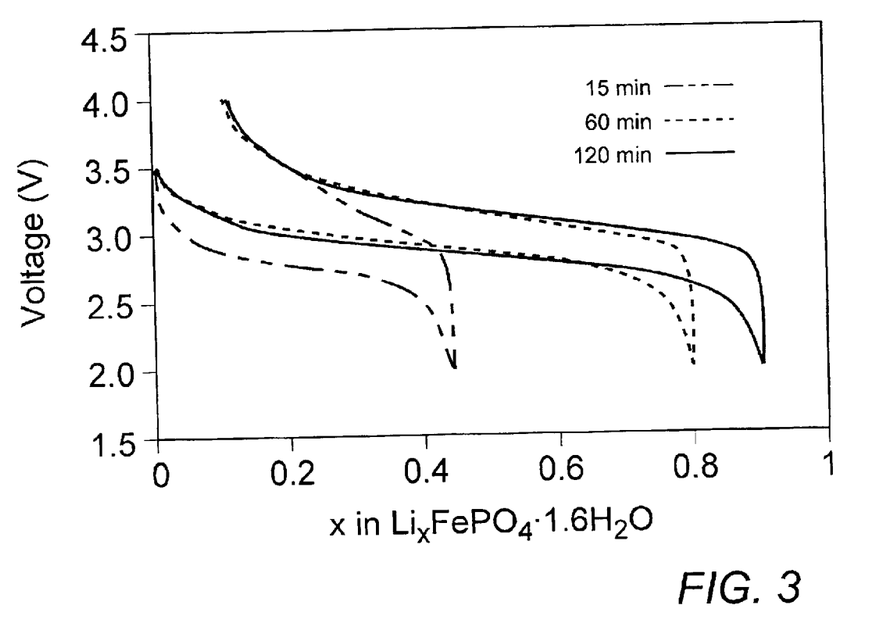
FIG. 3 depicts the effect of milling time with conductive carbon on characteristic voltage/electrode composition profiles of cycling rechargeable battery cells comprising amorphous $FePO_4 \cdot 1.6H_2O$ electrode compositions.

Test cells were prepared with electrode compositions comprising amorphous nominal $FePO_4 \cdot 2H_2O$ (separately assayed at $1.6H_2O$) which had been milled as above with the standard AB conductive carbon component for periods of 15 min, 60 min, and 120 min. These cells were cycled between 2 V and 4 V at a C/20 rate to yield the data depicted in the discharge/charge Li insertion profiles of FIG. 3. Despite the 4 V upper charging potential cut-off limit utilized for electrolyte protection, the 120 min milled electrode composition achieved about 90% of theoretical discharge capacity. The particle sizes of the tested electrode materials did not vary significantly from the pristine 100 nm; therefore, the observed improvements in electrochemical performance can fairly be attributed to the more consistent coating of carbon on the $FePO_4$ particles which was effected by the prolonged milling.

EXAMPLE III

Figure 4:
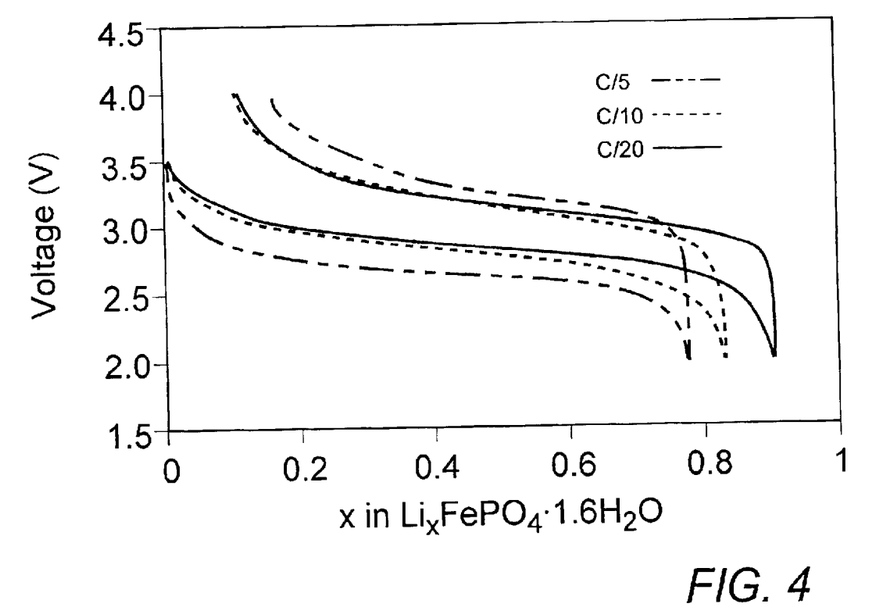
FIG. 4 depicts the effect of cycling rate on characteristic voltage/electrode composition profiles of cycling rechargeable battery cells comprising an amorphous $FePO_4 \cdot 1.6H_2O$ electrode composition.

The 120 min milled $FePO_4$ electrode material of Ex. II was used to prepare test cells which were cycled at increasingly rapid rates of C/20, C/10/ and C/5. The effect of cycle rate on the efficacy of Li insertion, and thus cell capacity, is depicted in the voltage/composition curves of FIG. 4. From these data it is apparent that over the significant rate range the cell capacity is diminished only about 10% with little increase in cell polarization.

EXAMPLE IV

Figure 5:
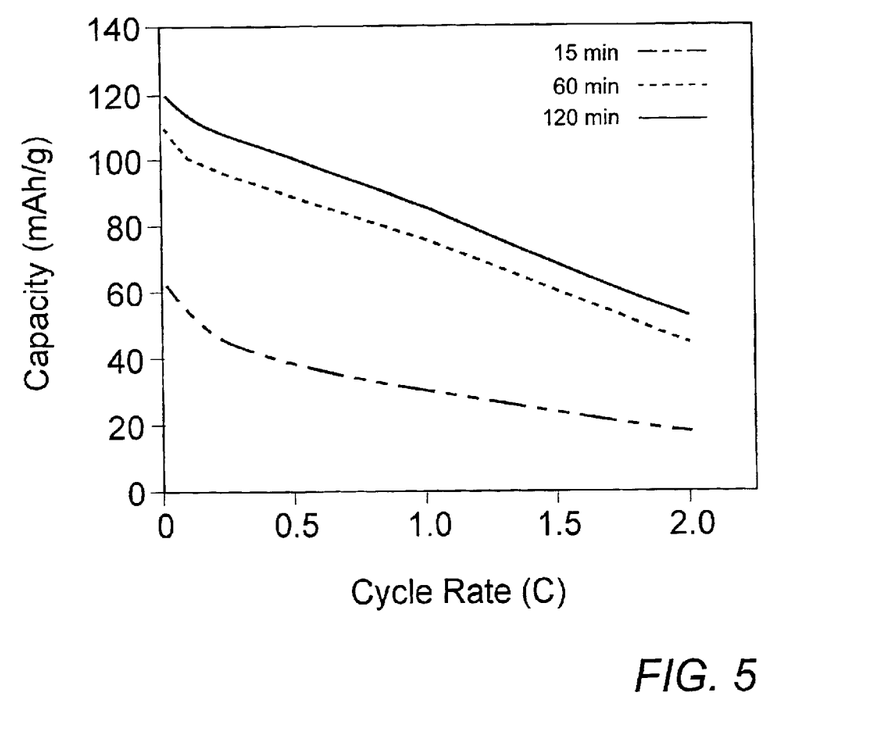
FIG. 5 depicts the effect of cycling rate on discharge capacity of cells characterized in FIG. 3.

In a further examination of cell cycle rate capability, test cells were prepared in the manner of Ex. II utilizing electrode materials of 15 min, 60 min, and 120 min milling time. Each cell was cycled at increasingly rapid rates to a 2 V discharge cut-off with a 30 min rest between each cycling test. The respective discharge capacities achieved by the cells at the varying cycling rates appear in the traces of FIG. 5.

EXAMPLE V

Figure 6:
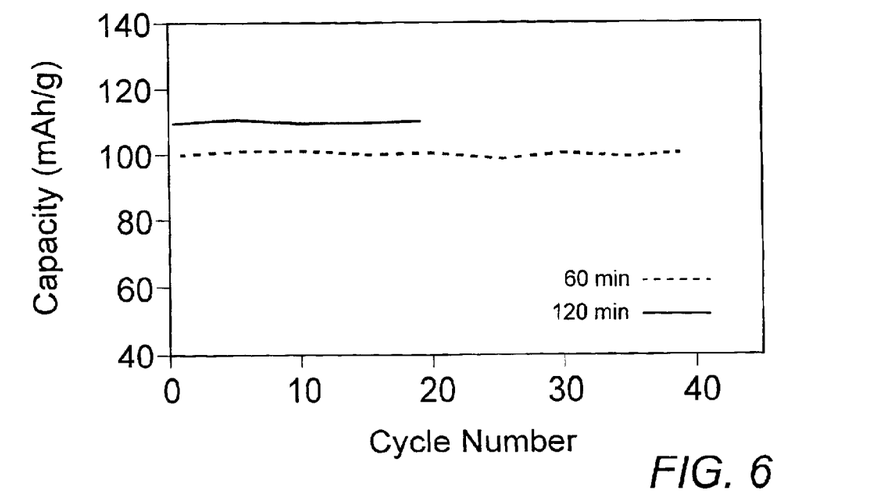
FIG. 6 depicts capacity stability over extended cycles for selected cells characterized in FIG. 3.

Duplicates of the better-performing cells of 60 min and 120 min milled electrode compositions from Ex. IV were cycled for extended periods at a C/5 rate in order to determine the capacity retention capabilities in such a higher rate range. The resulting specific capacity data depicted in FIG. 6 confirm the remarkable capacity stability maintained by these hydrated $FePO_4$ electrode compositions.

EXAMPLE VI

Figure 7:
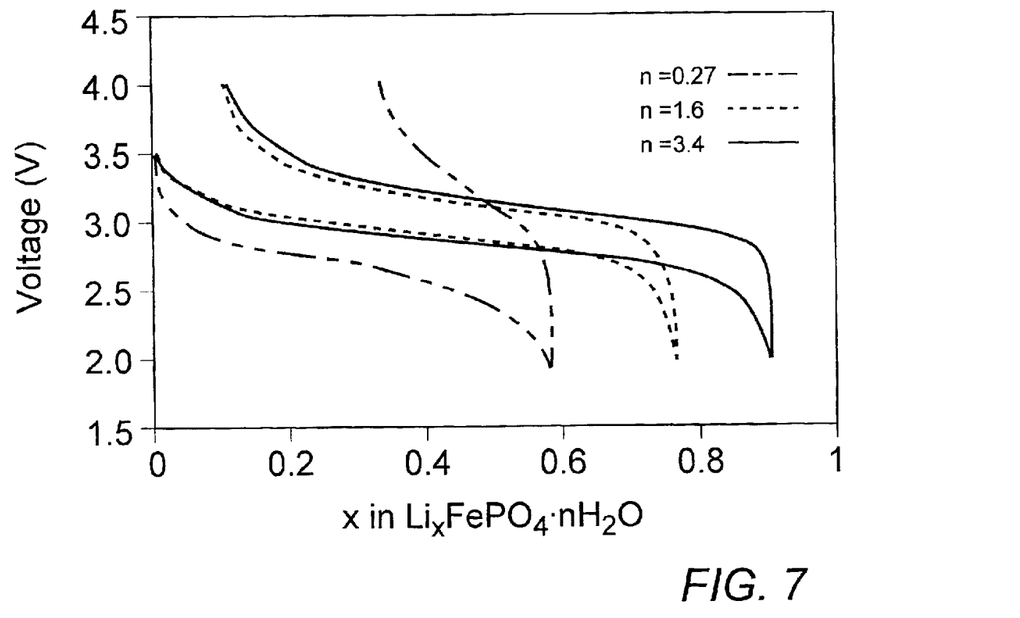
FIG. 7 depicts the effect of hydration on characteristic voltage/electrode composition profiles of cycling rechargeable battery cells comprising an amorphous $FePO_4 \cdot 1.6H_2O$ electrode composition.

The effect of water content in amorphous $FePO_4$ electrode compositions was investigated through the use of test cells prepared in the foregoing manner utilizing 40 min AB carbon milling with pristine nominal $FePO_4.2H_2O$ and $FePO_4.4H_2O$ (assayed respectively at $1.6H_2O$ and $3.4H_2O$) and a dehydrated material obtained from 400° C. annealing of pristine $FePO_4.2H_2O$ product. After cooling and storage at ambient room temperature, this latter material was confirmed as consisting substantially of amorphous $FePO_4.0.27H_2O$ having essentially the same surface area as the pristine product. Cycling the cells at a C/20 rate provided data of comparative electrochemical cell activity which is depicted in the traces of FIG. 7. It should be noted that while the observed electrochemical efficiency of Li insertion increases with hydrated water content in these active electrode materials, after mathematically accounting for the additional water in the "$4H_2O$" vis-à-vis the "$2H_2O$" compound, the specific capacities of cells comprising these hydrated materials are not greatly dissimilar.

EXAMPLE VII

Figure 8:
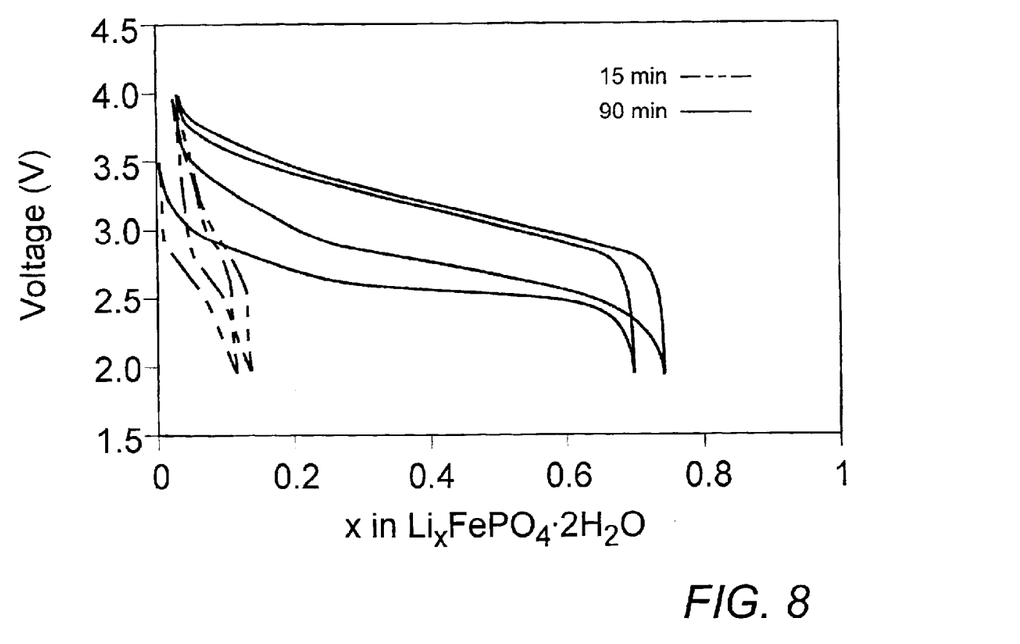
FIG. 8 depicts the effect of milling time with conductive carbon on characteristic voltage/electrode composition profiles of cycling rechargeable battery cells comprising crystalline $FePO_4 \cdot 2H_2O$ electrode compositions.

In order to determine whether improvements can be obtained in the electrochemical activity of crystalline $FePO_4$ in a manner similar to those realized with the amorphous material, the crystalline $FePO_4.2H_2O$ compound of Ex. I was used to prepare a series of electrode materials varying in AB carbon milling times. Test cell cycling at a rate of C/20 indicated a significant improvement in Li insertion with milling time and suggested a particularly useful electrode composition resulting from 90 min milling. SEM and X-ray diffraction analyses of this composition confirmed the persistent crystalline structure of the active compound and indicated a reduction in crystal particle size to about 500 nm. Test cell cycling data obtained from the series of electrode materials resulted in the distinctive voltage/composition traces of FIG. 8 which show the vast improvement from the earlier example and an attainment of about 70% theoretical capacity in the optimized electrode composition.

EXAMPLE VIII

Figure 9:
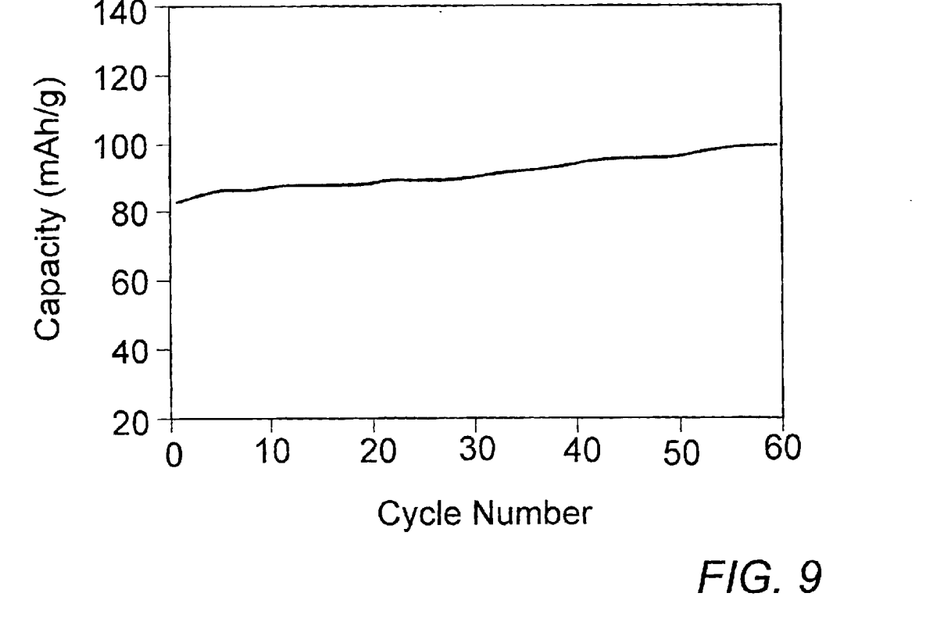
FIG. 9 depicts capacity stability over extended cycles for an optimized cell characterized in FIG. 8.

A duplicate of the optimized cell of Ex. VII (90 min milling) was tested over extended cycles at a C/5 rate to determine the stability of the initially achieved capacity at the increased usage rate. The results of this test are depicted in FIG. 9 and show not only an undiminished specific capacity, but also indicate an increase of capacity with cycling which may be attributed to the enhancement due to "electrochemical milling" often observed occurring as a result of crystal particle fracture at the instance of repeated Li insertions.

EXAMPLE IX

Figure 10:
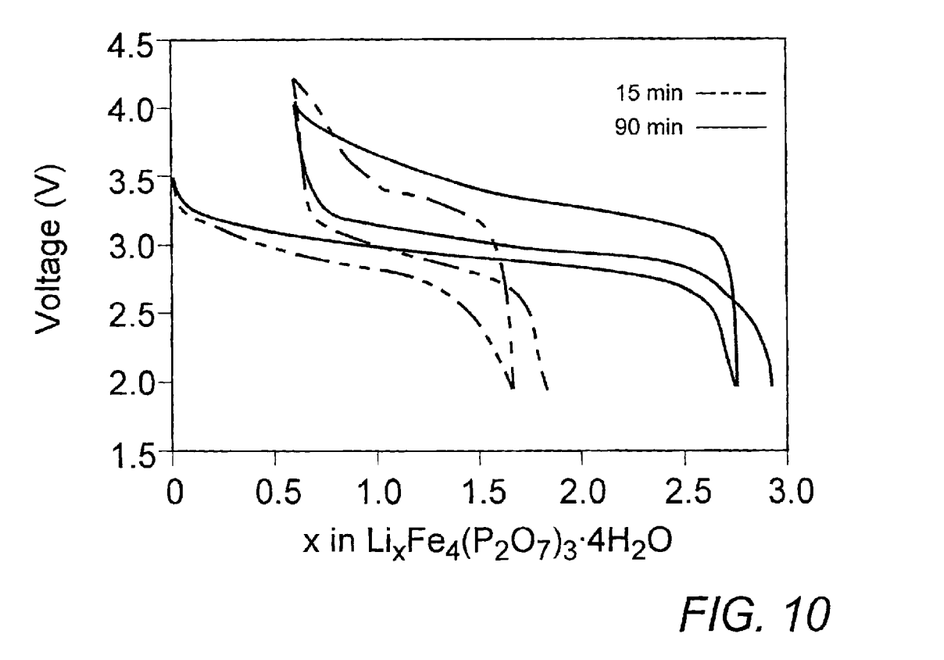
FIG. 10 depicts the effect of milling time with conductive carbon on characteristic voltage/electrode composition profiles of cycling rechargeable battery cells comprising amorphous $Fe_4(P_2O_7)_3 \cdot 4H_2O$ electrode compositions.
Figure 11:
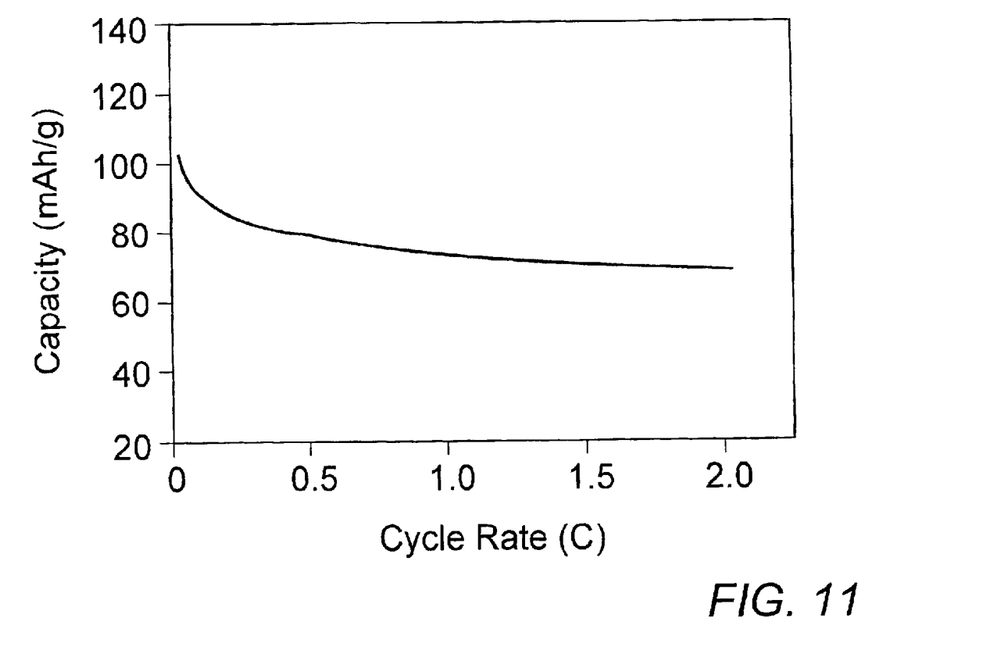
FIG. 11 depicts the effect of cycling rate on capacity stability over extended cycles for an optimized cell characterized in FIG. 10.

Another $Fe^{III}$ compound was examined for the role of positive active cell electrode component in the form of a commercial amorphous $Fe_4(P_2O_7)_3.4H_2O$ having surface area of about 5 m²/g. Samples of this compound were milled in the manner of the foregoing examples with AB carbon for periods of 15 min and 90 min to obtain test cell active electrode compositions. Cells cycled at a C/5 rate provided the data depicted in the comparative traces of FIG. 10. Extended cycling of the 90 min (mill time) cell at varying rates showed the respectable discharge capacity stability depicted in FIG. 11.

EXAMPLE X

Figure 12:
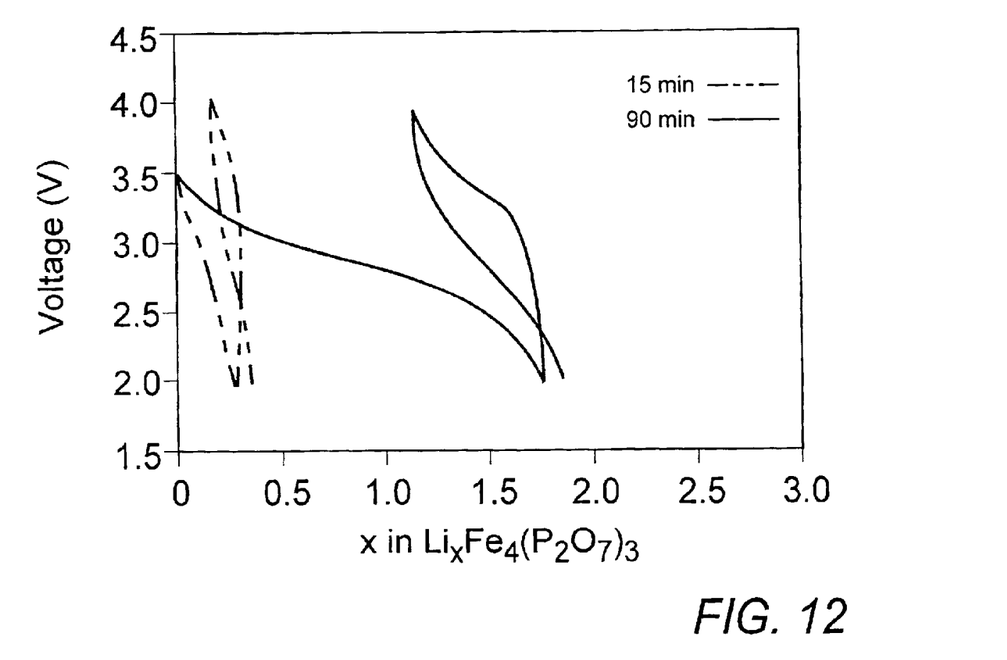
FIG. 12 depicts the effect of milling time with conductive carbon on characteristic voltage/electrode composition profiles of cycling rechargeable battery cells comprising crystalline $Fe_4(P_2O_7)_3$ electrode compositions.

The amorphous $Fe_4(P_2O_7)_3.4H_2O$ compound of Ex. IX was annealed at about 900° C. to obtain a well-formed anhydrous crystalline material which was utilized in place of the amorphous compound of Ex. IX to fabricate test cells for comparative study. As was indicated in earlier examples, the crystalline active compositions lack the efficacy of the amorphous product, but exhibit significant electrochemical activity, as shown in the voltage/composition traces of FIG. 12.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A rechargeable electrochemical energy storage system comprising: a first electrode member of first polarity; a second electrode member of second polarity opposite said first polarity; and a separator member interposed between said first and second electrode members, said separator providing an electrolyte; wherein one of said first or second electrode members comprises a non-lithiated metal $Fe^{III}$ phosphate compound.

2. An energy storage system according to claim 1 wherein said $Fe^{III}$ phosphate compound is selected from the group consisting of crystalline and amorphous $FePO_4.nH_2O$ and $Fe_4(P_2O_7)_3.nH_2O$ wherein $0 \leq n \leq 4$.

3. An energy storage system according to claim 1 wherein said $F_{III}$ phosphate compound is admixed with an electrically conductive material.

4. An energy storage system according to claim 3 wherein said electrically conductive material is particulate carbon.

5. An energy storage system according to claim 2 wherein said $Fe^{III}$ phosphate compound is amorphous and has a particle size of about 100 nm.

6. An energy storage system according to claim 2 wherein said $Fe^{III}$ phosphate compound is crystalline and has a particle size of about 500 nm.

7. An energy storage system according to claim 1 comprising a lithium battery cell.

8. An energy storage system according to claim 7 wherein the other of said first or second electrode members comprises a source of lithium ions and said electrolyte comprises a non-aqueous solution of a dissociable lithium salt.

9. An electrode material comprising a non-lithiated metal $Fe^{III}$ phosphate compound, wherein said $Fe^{III}$ phosphate compound is admixed with electrically conductive particulate carbon.

10. An electrode material according to claim 9 wherein said $Fe^{III}$ phosphate compound is selected from the group consisting of crystalline and amorphous $FePO_4 \cdot nH_2O$ and $Fe_4(P_2O_7)_3 \cdot nH_2O$ wherein $0 \leq n \leq 4$.

11. An electrode material according to claim 9 wherein said the weight ratio of particulate $Fe^{III}$ phosphate compound to said electrically conductive material is about 5:1.

12. An electrode material according to claim 9 wherein said $Fe^{III}$ phosphate compound is amorphous and has a particle size of about 100 nm.

13. An electrode material according to claim 9 wherein said $Fe^{III}$ phosphate compound is crystalline and has a particle size of about 500 nm.

14. A method of making a rechargeable electrochemical storage system comprising the steps of: providing a first electrode member of first polarity; providing a second electrode member of second polarity opposite said first polarity; providing a separator member including an electrolyte; interposing said separator between said first and second electrode members; and laminating said first electrode member, said separator and said second electrode member together; wherein one of said first or second electrode members comprises a non-lithiated metal $Fe^{III}$ phosphate compound.

15. A method of making an electrode material comprising the steps of: providing a particulate $Fe^{III}$ phosphate compound selected from the from the group consisting of crystalline and amorphous $FePO_4 \cdot nH_2O$ and $Fe_4(P_2O_7)_3 \cdot nH_2O$ wherein $0 \leq n \leq 4$; providing an electrically conductive material; and admixing said electrically conductive material with said particulate $Fe^{III}$ phosphate compound.

16. A method according to claim 15 wherein said electrically conductive material is particulate carbon.

17. A method according to claim 15 wherein said particulate $Fe^{III}$ phosphate compound is provided in a weight ratio of 5:1 to said electrically conductive material.

18. A method according to claim 15 wherein said step of admixing comprises ball-milling.

19. A method according to claim 18 wherein said ball-milling is conducted for a period of about 15 min to 120 min with a steel ball charge to composition weight ratio of about 15:1 to 20:1.

* * * * *